(No Model.) 8 Sheets—Sheet 1.

J. H. SPARROW.
PROCESS OF AND APPARATUS FOR HANDLING, SLAUGHTERING AND DRESSING BEEF CATTLE.

No. 243,809. Patented July 5, 1881.

Witnesses:
E. A. Hemmenway
Walter E. Lombard

Inventor:
James H. Sparrow
by N. C. Lombard
Attorney.

(No Model.) 8 Sheets—Sheet 2.

J. H. SPARROW.
PROCESS OF AND APPARATUS FOR HANDLING, SLAUGHTERING AND DRESSING BEEF CATTLE.

No. 243,809. Patented July 5, 1881.

Witnesses:
E. A. Hemmenway
Walter E. Lombard.

Inventor:
James H. Sparrow
by N. C. Lombard
Attorney.

(No Model.)  8 Sheets—Sheet 5.

J. H. SPARROW.
PROCESS OF AND APPARATUS FOR HANDLING, SLAUGHTERING AND DRESSING BEEF CATTLE.

No. 243,809.  Patented July 5, 1881.

Fig. 5.

Witnesses:  Inventor:
E. A. Hemmenway  James H. Sparrow
Walter E. Lombard  by N. C. Lombard
  Attorney.

(No Model.) 8 Sheets—Sheet 7.

J. H. SPARROW.
PROCESS OF AND APPARATUS FOR HANDLING, SLAUGHTERING AND DRESSING BEEF CATTLE.

No. 243,809. Patented July 5, 1881.

Fig. 7.

Witnesses:
E. A. Hemmenway.
Walter E. Lombard.

Inventor:
James H. Sparrow
by N. C. Lombard
Attorney.

(No Model.) 8 Sheets—Sheet 8.

J. H. SPARROW.
PROCESS OF AND APPARATUS FOR HANDLING, SLAUGHTERING AND DRESSING BEEF CATTLE.

No. 243,809. Patented July 5, 1881.

Witnesses:
E. A. Hemmenway
Walter E. Lombard

Inventor:
James H. Sparrow
by N. C. Lombard
Attorney.

UNITED STATES PATENT OFFICE.

JAMES H. SPARROW, OF CAMBRIDGEPORT, MASSACHUSETTS.

PROCESS OF AND APPARATUS FOR HANDLING, SLAUGHTERING, AND DRESSING BEEF-CATTLE.

SPECIFICATION forming part of Letters Patent No. 243,809, dated July 5, 1881.

Application filed December 18, 1880. (No model.)

*To all whom it may concern:*

Be it known that I, JAMES H. SPARROW, of Cambridgeport, in the county of Middlesex and State of Massachusetts, have invented a new and useful Process of and Apparatus for Handling, Slaughtering, Dressing, Cooling, and Transporting Beef-Cattle, of which the following, taken in connection with the accompanying drawings, is a specification.

My invention relates to an improved process of and apparatus for handling, slaughtering, and dressing beef-cattle and cooling and transporting the dressed beef, and has for its object a great saving in the labor and consequent expense of the several operations which make up the complete process.

The great obstacles to be overcome in slaughtering cattle by the methods now and heretofore practiced are the animals' volition and weight, and the yarding of the cattle in large numbers in close proximity to the slaughtering-room has required large and expensive space, and the cattle, when crowded promiscuously into a close room without separating-partitions, are liable to bruise and injure each other, very much to the detriment of the beef when dressed. These objections are entirely overcome by the use of my improved process and apparatus, the volition and weight of the animals being utilized as the motive power used in handling the heaviest animals, and the use of my labyrinthine close pen rendering it next to impossible for the animals to injure each other, while at the same time fifty-three of the largest bullocks can be yarded in a ground space thirty-six feet square, the animals being arranged in single file in passages, where they are accessible to and completely under the control of a keeper.

My invention consists, first, in the process or method of handling and slaughtering beef-cattle by causing the animal to walk up a series of steps or an inclined plane to the second or third story of a building, rendering him insensible to pain by shooting, by a blow upon the head, by pricking the spinal cord at the back of the neck, by a shock of electricity, or otherwise, hooking, grappling, or otherwise attaching him by the hind leg to a truck-rail or other support, while in a close stall, without moving him, causing the animal to fall head downward until his whole weight is supported by a single hind leg, and then opening the veins in his neck and allowing him to bleed until the blood is all drained from the carcass.

It further consists in the process or method of slaughtering and dressing beef-cattle by first causing the animal to walk to the second or third story of the building, hooking, while in a close stall, without moving him, grappling, or otherwise attaching him by one hind leg to a supporting-rail, causing the animal to fall by his own weight and the force of gravity until he is suspended from said rail-head downward, then opening the veins in his neck to bleed him, skinning the head, tail, and legs, and removing the head, tail, and all the legs except the one by which he is suspended, allowing the body to move by the force of gravity to a new position, changing the suspension from one to both hind legs, completing the skinning of the carcass and removing the intestines and vitals at different points, as it is intermittently moved by the force of gravity along the supporting-rail and arrested in the desired position, and finally dividing the carcass into halves by sawing longitudinally through the spinal column while the carcass remains suspended from the truck-rail by the hind legs.

It further consists in the process or method of slaughtering, dressing, cooling, and transporting beef-cattle by causing the animal to walk to an elevated position in the building, hooking, grappling, or otherwise attaching the animal by the hind leg to a supporting-rail, causing the animal to fall from his elevated position until he hangs head downward from said rail; bleeding him, skinning and removing the head, tail, and legs, allowing the carcass to move by the force of gravity to a new position, changing the suspension from one to both hind legs and at a lower level, performing all the operations of skinning the body, removing the intestines and vitals, and finally dividing the body longitudinally into halves by means of a power-saw arranged to move downward through the carcass while it is still suspended from the supporting-rail, moving the sides of beef still suspended from the said rail to the cooling-areas, thence to the refrigerator, thence on board a car or boat for transportation to distant points, and, finally, from the car or boat to the wholesale dealer's storehouse, the sides of beef never leaving the position of suspension by the hind leg from the time that the animal is so suspended until it is cut down for delivery to the retail dealer.

It further consists in the method of suspending beef-cattle by hooking, grappling, or otherwise connecting the animals by their hind legs to a truck-rail or other support, while said animals are in a close pen, without moving them, and allowing them to fall head downward, as distinguished from hoisting them to a higher level, as heretofore practiced.

It further consists in the employment of certain mechanical devices and apparatus for facilitating and carrying out the above-described processes or methods of slaughtering, dressing, cooling, and transporting beef-cattle, which devices and apparatus will be readily understood by reference to the description of the drawings, and the claims, to be hereinafter given.

Figs. 8 and 9 are elevations of the extensible truck-hook by which the animal is first suspended. Fig. 10 is a transverse section on lines 2 2 on Figs. 8 and 9, enlarged. Fig. 11 is a side elevation of the pivoted rail-section and its appendages. Fig. 12 is an elevation of the opposite side of the same devices. Fig. 13 is a vertical transverse section on line 3 3 on Fig. 11. Fig. 14 is a vertical transverse section on line 4 4 on Fig. 12. Fig. 15 is a partial longitudinal section on line 5 5 on Fig. 13, enlarged. Fig. 16 is a plan of a section of the truck-rails with the automatic truck-stop attached. Fig. 17 is an elevation of the same with the truck in position thereon. Fig. 18 is a vertical transverse section on line 6 6 on Fig. 17, and Figs. 19 and 20 are respectively a side elevation and a sectional plan of the claw-hook to be used in changing the suspension from one to both hind legs. Figs. 1, 2, 3, 4, 5, and 7 are drawn to a scale of one sixty-fourth of an inch to the inch. Fig. 6 is drawn to a scale of one two-hundred-and-fortieth of an inch to the inch, and all the other figures to a scale of one-twelfth of an inch to an inch.

In the drawings, A is that portion of the buildings which contains what I term the "labyrinthine close pen." B is the dead-stall; C, the slaughtering and dressing room; D D, the cooling-corridors; E E, the refrigerating-chambers; F, the ice-receptacles; G G, cars for transporting the sides of beef on land, and H is a lighter or scow for transporting the beef to deep water, where it may be transferred to the hold or between-decks of a larger vessel for transportation by water to a distant foreign or domestic port.

Figure 1:
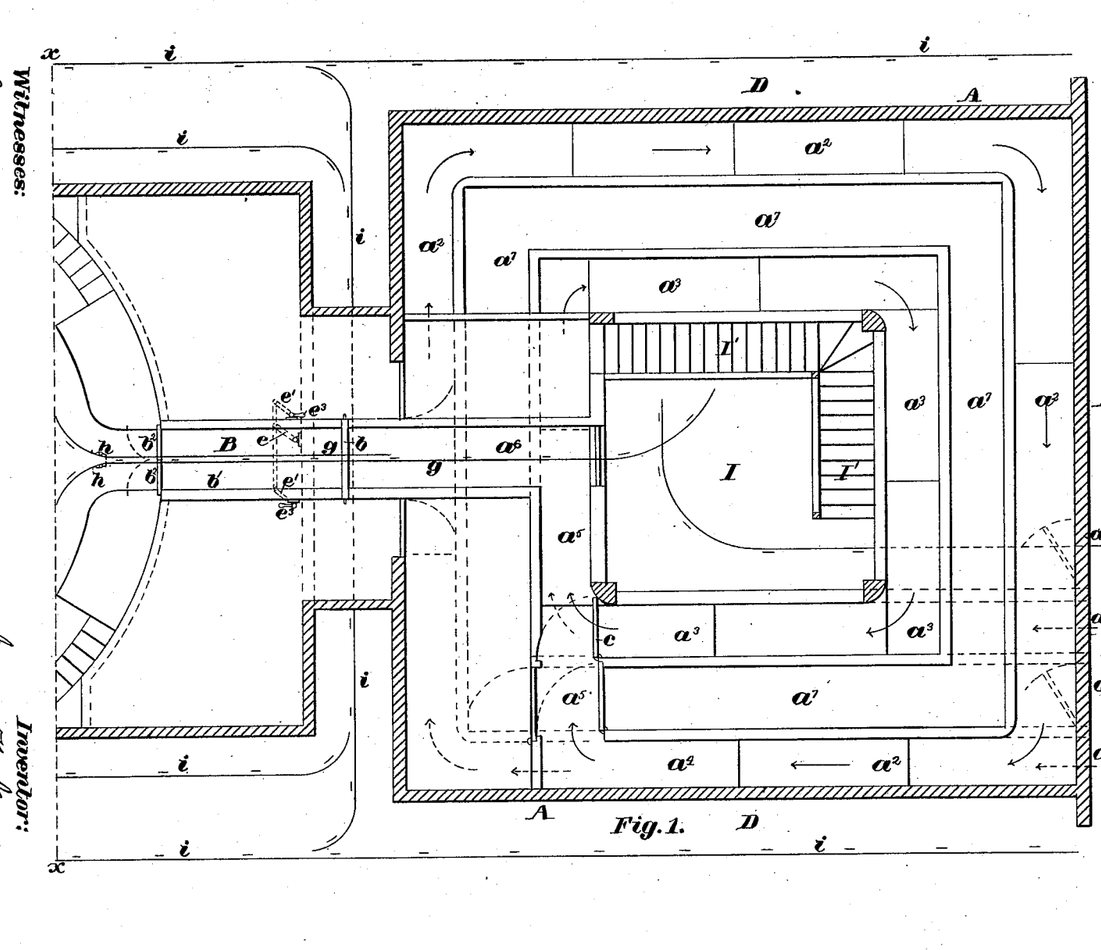
Figures 1 and 2 of the drawings, taken together and so placed that the lines $x\ x$ coincide, represent a plan of the close pens and the slaughtering and dressing rooms.
Figure 3:
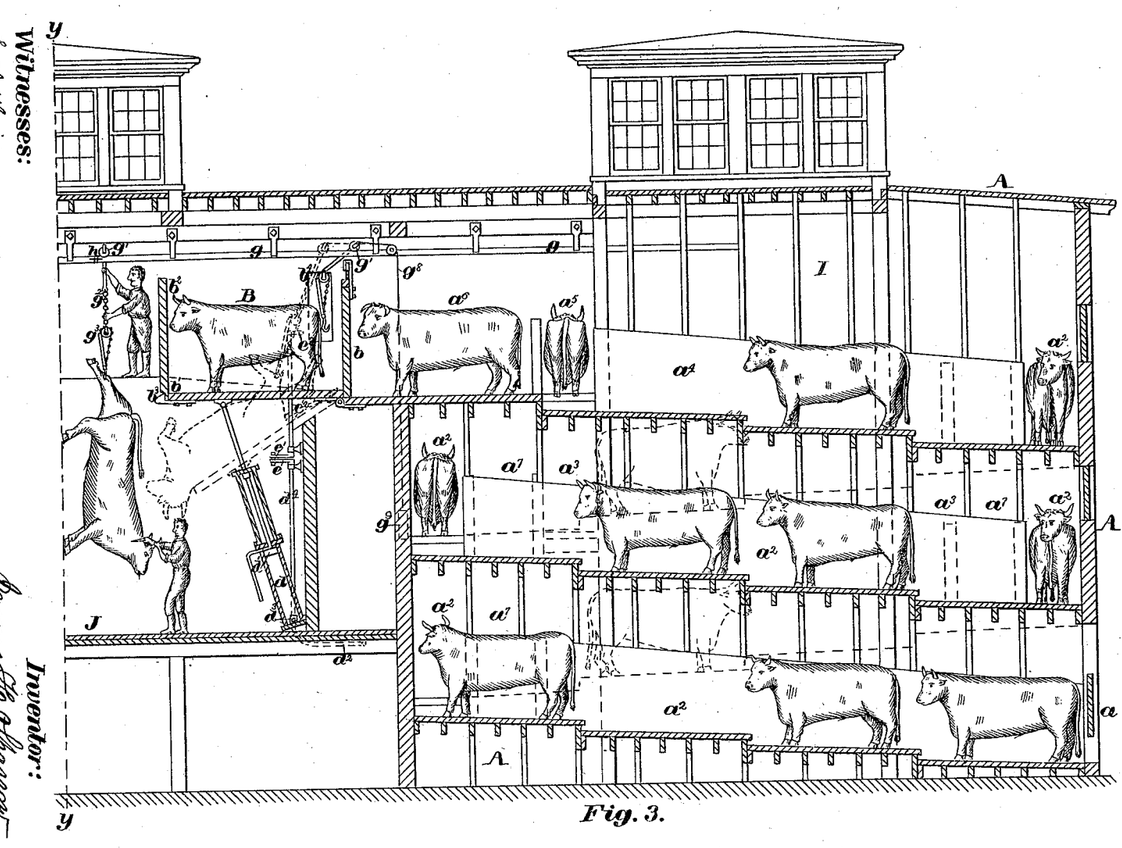
Figs. 3 and 4, when placed together so that the lines $y\ y$ coincide, represent a vertical longitudinal section of the same, or an interior elevation with the side wall removed.
Figure 4:
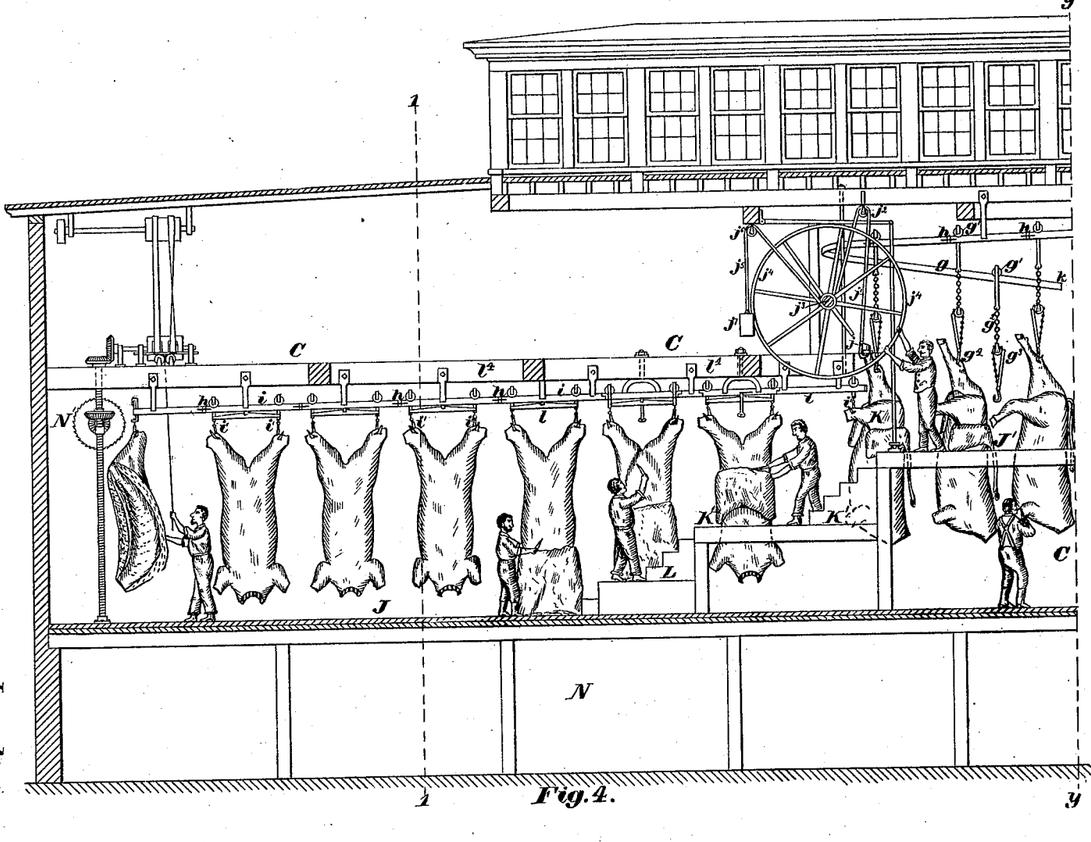
Figure 5:
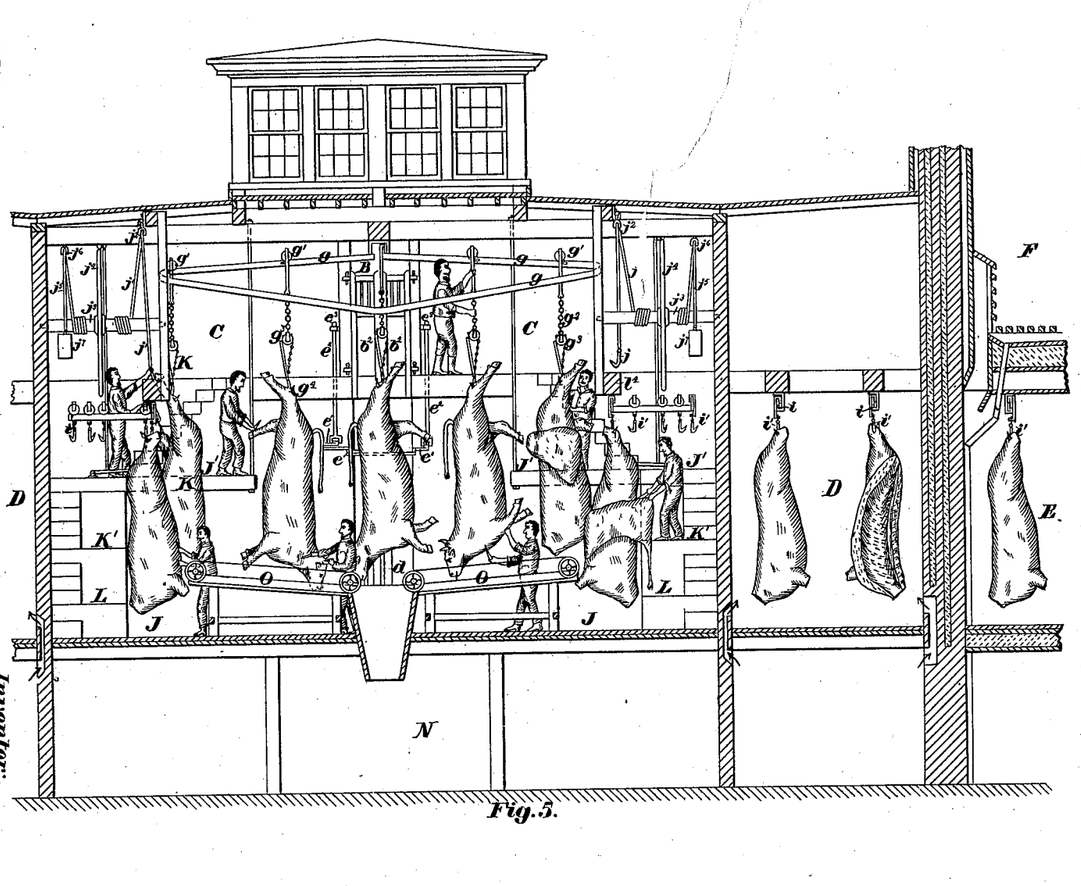
Fig. 5 is a vertical transverse section of the same on line 1 1 on Figs. 2 and 4, looking toward the dead-stall and close pens, and showing, in addition, a section of one of the cooling-corridors and a portion of one of the refrigerator-buildings.

The animals to be slaughtered are driven one after the other into the building through the open doors $a$ and $a'$, and follow each other in single file along the winding passage $a^2$ or $a^3$, gradually ascending by means of a series of steps, as shown, or by an inclined plane, to the third story of the building, each animal in the outer passage, $a^2$, following the course clearly indicated by the positions of the animals shown in Fig. 3 and by the arrows in Fig. 1 until he has made the complete circuit of the building twice and reached the point $a^4$ on his third round, when he turns into the passage $a^5$, along which he travels until he can go no farther in that direction, when he turns to the left into the passage $a^6$, where he stops before the sliding door $b$ of the dead-stall B, which is closed. Each animal which enters the inner passage, $a^3$, follows a similar course, as indicated by arrows in full and dotted lines, until he has reached the door or gate $c$ on the third floor, where he remains until the gate $c$ is opened and swung across the passage $a^5$, when he turns to the right into said passage, and thence into the passage $a^6$, as before described.

Figure 6:
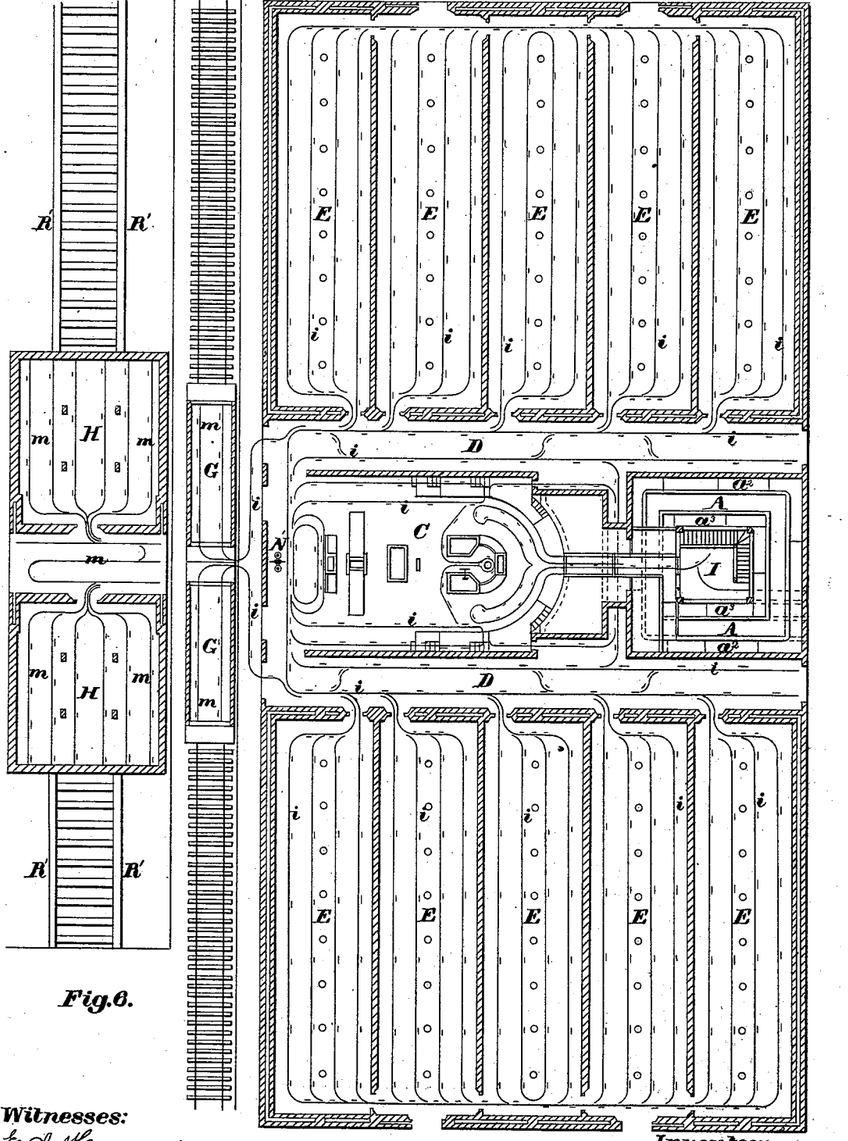
Fig. 6 is a general ground plan of the set of buildings, including the close pens, the slaughtering and dressing rooms, the cooling-corridors, the refrigerators, railway-cars, and a boat or lighter, and illustrating the complete system of rails whereby the animals or their carcasses are moved from the point where the animal is killed and suspended to the cooling-corridors, thence to the refrigerators, and from the refrigerators to the cars for transportation by land, or to the lighters or other boats for transportation by water.
Figure 7:
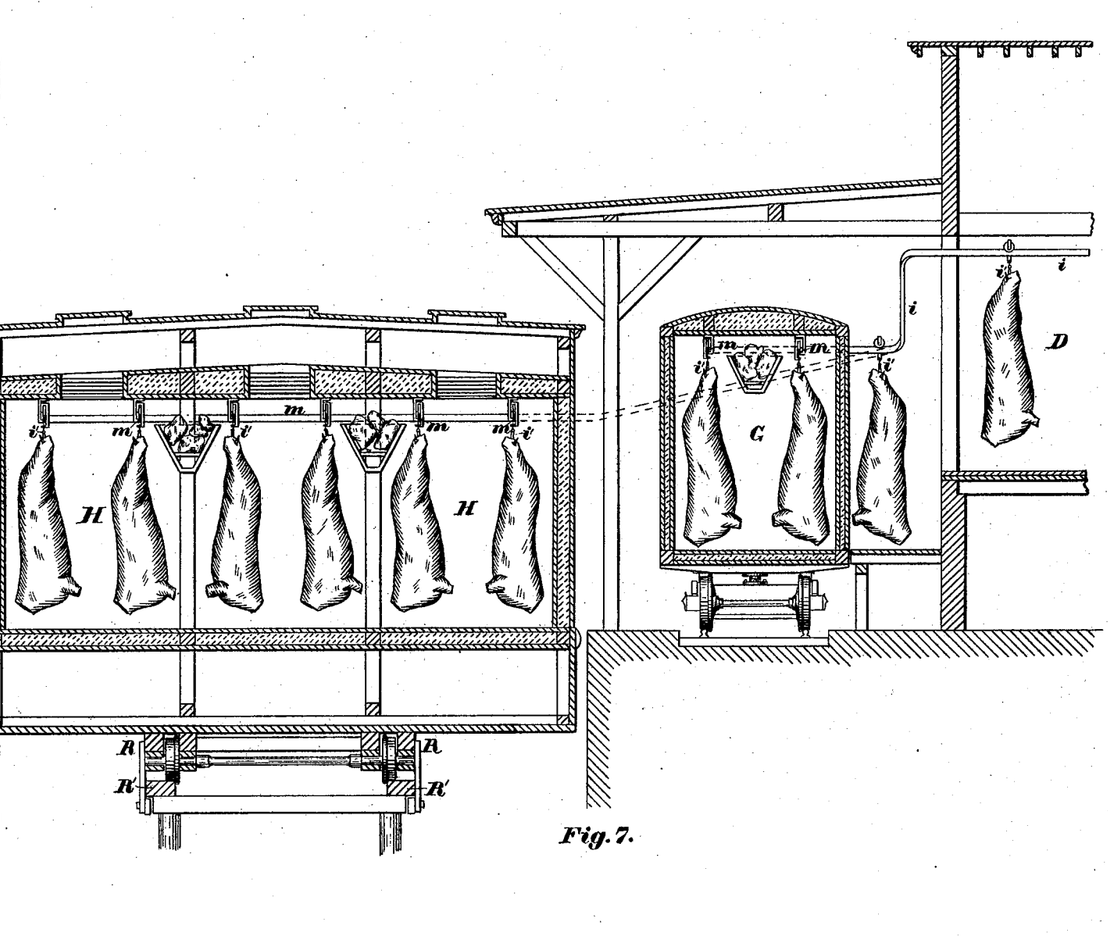
Fig. 7 is a vertical section transversely of a car and a lighter or boat and longitudinally of a portion of one of the cooling-corridors, to illustrate the process of shipping the sides of beef for transportation by land or water.
Figures 8, 9, 10, 11, 12, 13, 14, 15, 16, 17, 18, 19, 20:
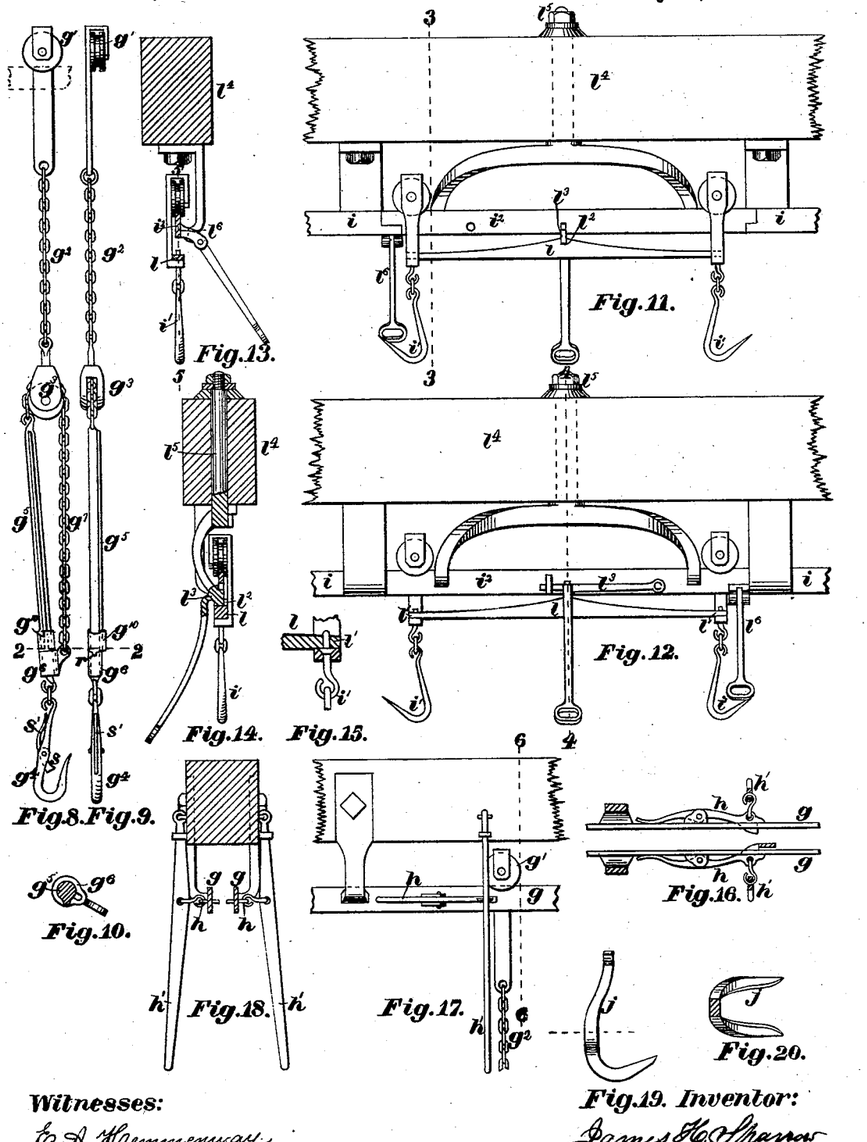

Between the passages $a^2$ and $a^3$ is a third winding and ascending passage, $a^7$, access to which is had through the door $a^8$ in the lower story, and along which the keeper or keepers in charge of the animals pass from said entrance to the third story, in convenient positions at all times to care for and control the animals in either of the passages $a^2$ or $a^3$. In the center of this portion of the building is a well-room, I, extending from the lower floor to the top of the building, around two sides of which is a stairway, I', leading to the upper floor of the building, as shown in Figs. 1 and 6, access to said well-room being had through the door $a^9$ in the lower story.

The floor or drop $b'$ of the dead-stall B is pivoted at its rear end in such a manner that its free or movable end may be moved downward into a position at an angle to a horizontal line of from thirty to forty-five degrees.

The drop $b'$ may be raised to a horizontal position by means of cords or chains which connect with and wind upon the shaft or drum of a windlass, and a counterbalance-weight connected by another cord or chain to said drum or shaft in such a manner that the descent of said weight will rotate said drum and wind up thereon the suspension chains or cords which support the drop $b'$, and the same may be prevented from descending when the animal steps upon it until the desired time by means of a brake applied to the periphery of a large wheel upon the shaft or drum of the windlass in any well-known manner, the releasing of which allows the weight of the animal upon the drop to cause its free end to descend, as will be hereinafter described. I prefer, however, to support the drop $b'$ by means of an apparatus which I term a "hydraulic gill," which consists of a cylinder, $d$, fitted with a piston, $d'$, which works water-tight therein, and is connected by suitable piston and connecting rods to the under side of the drop $b'$, the lower end of said cylinder $d$ being connected by a suitable supply-pipe, $d^2$, with a tank located in the upper part of the building, or with any other reservoir of water or other liquid suitably located to give the desired head, and said pipe or the lower end of the cylinder being provided with a valve, $d^3$, for opening and closing communication between said tank or other supply and the cylinder, and means of operating said valve from the upper floor of the building and from either side of the dead-stall B, the devices shown for this purpose being the valve-stem $d^4$, levers $e$ $e'$ $e'$, rocker-shafts $e^2$ $e^2$, and hand-levers $e^3$ $e^3$, and suitable links connecting the levers $e'$ $e'$ with $e$.

The head of water and the area of the piston $d'$ are so proportioned to each other as to give sufficient power from the head alone to raise the drop $b'$ to a horizontal position and maintain it in such position so long as the load is not increased beyond a given limit, even though the valve remains open; but if the valve $d^3$ be closed as soon as the drop $b'$ has assumed its horizontal position, so that the water beneath the piston $d'$ cannot escape through the valve $d^3$ and be forced back into the tank or reservoir, and the piston $d'$ is so constructed and packed that the water beneath it cannot leak past it, the drop $b'$ will maintain its horizontal position whatever may be the load that is placed thereon, provided, of course, that the load is kept within the limits warranted by the strength of the drop itself and the supporting-gill.

The front end of the dead-stall B is provided with a pair of hinged doors, $b^2$ $b^2$, which are retained in a closed position, while the drop $b'$ is maintained in a closed or horizontal position by means of the catch $b^3$, attached to the front end of said drop, which engages with the lower edges of both doors, as shown in Fig. 3.

Figure 2:
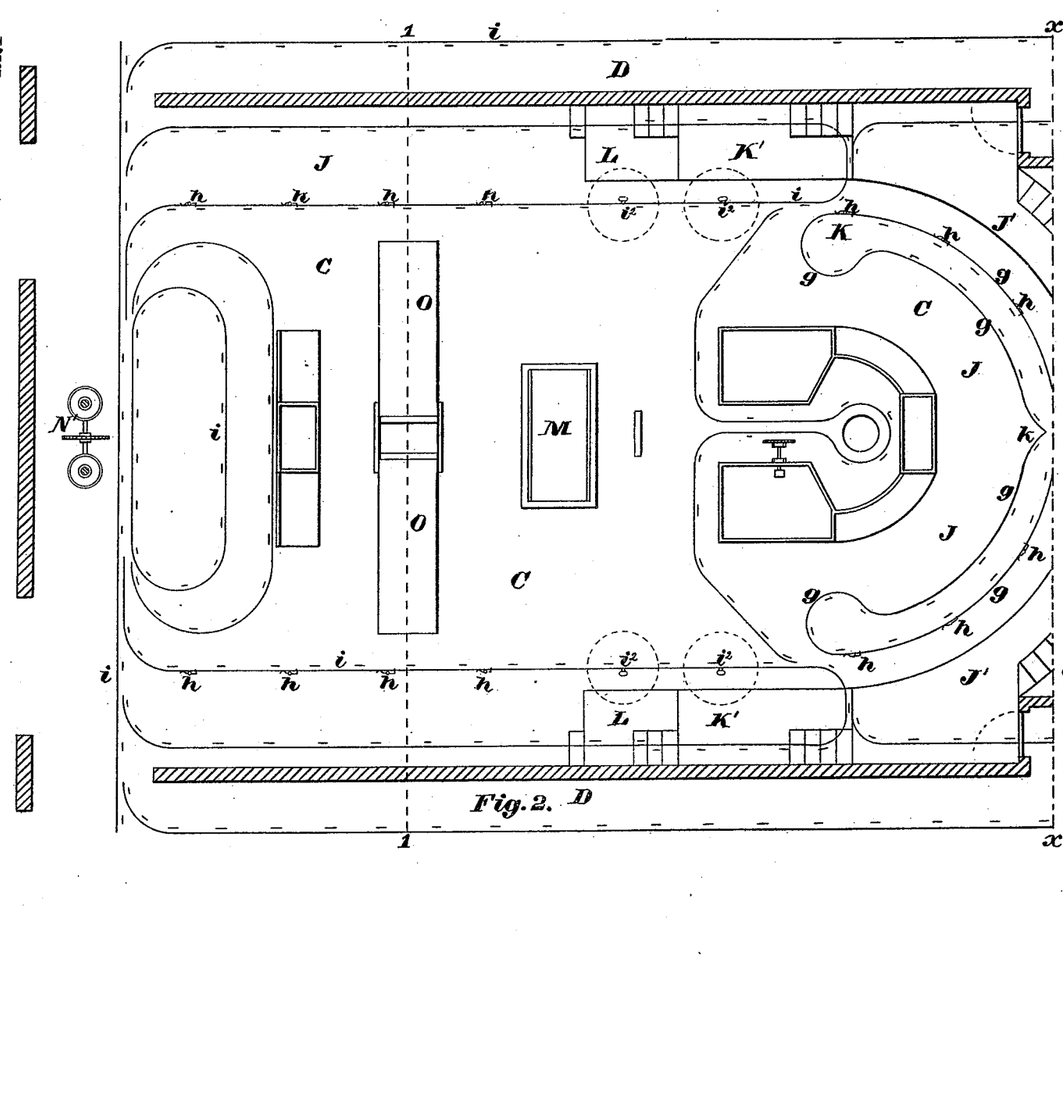

Above the dead-stall B are arranged a pair of slightly-inclined iron rails, $g$ $g$, near to and parallel with each other for the length of said stall and for some little distance beyond its front end, where they diverge from each other in curved lines, and at points some distance farther forward they are curved inward and backward until they meet at a point directly beneath the point of first divergence, as shown in Figs. 1, 2, 3, and 4, said rails being represented in Figs. 1 and 2 by a single heavy line for each rail. Upon each of these rails may be placed a grooved truck, $g'$, from the frame of which is suspended a short chain, $g^2$, having attached to its lower end a pulley-block, $g^3$, from which is suspended the sharp-pointed hook $g^4$, provided with the spring-locking latch $s$, the medium of suspension being an extensible loop composed of the splined rod $g^5$, swivel-sleeve $g^6$, and the chain $g^7$, the sleeve $g^6$ being provided with a groove to fit the spline on the rod $g^5$, and also with a detent-notch, $r$, into which a projecting tooth on the lower end of the secondary or locking sleeve $g^{10}$ falls when the sleeve $g^6$ is in its lowest position on the rod $g^5$, and turned thereon so that the lower end of the spline rests on the upper end of said sleeve, thus locking said sleeve against accidental displacement. These hooks are suspended from the rails $g$ $g$ near the rear of the dead-stall, and are swung outward from their natural pendent positions through openings $b^4$ in the side walls of said stall, to remove them out of the way of the animal entering said stall, the trucks $g'$ being prevented from rolling toward the front of the dead-stall by the cord $g^8$ and the counterbalance-weight $g^9$.

Instead of the hook $g^4$, designed to pierce the skin and pass between the tendons of the hock-joint, a grapple may be substituted which will grasp the leg above or below the hock-joint, and thus suspend the animal without piercing the leg; or any other means of connecting the animal by the hind leg to a truck-rail or other support may be used without affecting the principles of my invention, the hook above described simply illustrating one convenient method of accomplishing the desired end—viz., attaching the animal by the hind leg to a truck-rail or other support, so that by simply allowing the animal to fall to a lower level by his own weight he will be suspended head downward.

The close pen having been filled with cattle and a bullock being in the passage $a^6$, if the door $b$ is opened the animal will either voluntarily or in response to a light touch of the whip of a keeper step into the dead-stall B, his whole weight being supported by the drop $b'$ and the hydraulic gill. When the animal is fairly on the drop $b'$ the door $b$ is closed, so as to effectually separate him from the other animals in his rear and prevent any knowledge of what becomes of him being conveyed to them. The animal is now rendered insensible by shooting, by a blow upon the head, by pricking the spinal cord at the back of the neck, by a shock of electricity, or otherwise, and the keeper or attendant in charge of the dead-stall seizes the hook $g^4$ in such a manner as to compress the spring $s'$ and throw back the locking-latch $s$, the rod $g^5$, swivel $g^6$, and chain $g^7$ being so adjusted as to make the suspension-loop of its shortest possible length, and, reaching through the opening $b^4$, inserts the sharp point of said hook through the skin and tendons of the hock-joint of a hind leg, the locking-latch being moved inward on his relaxing his grasp upon the spring, so as to prevent the hook from being accidentally disengaged. As quick as the hook is fairly inserted the operator turns the rocker-shaft $e^2$ to open the valve $d^3$, when the excess of weight of the animal over the pressure upon the under side of the piston $d'$ will cause the drop $b'$ and the piston $d'$ to descend, said piston forcing the water out of the cylinder $d$ through the valve $d^3$ and pipe $d^2$ into the tank or reservoir, and the animal on the drop will fall or slide head downward until his whole weight is suspended from the hook $g^4$ and he hangs in a perpendicular position, entirely free of the front end of the drop. His weight, being brought to bear obliquely upon the hook $g^4$, causes the truck $g'$ to roll down the inclined rail $g$, raising the counter-weight $g^9$ until the truck is arrested by an automatic truck-stop at the desired point.

The truck-stop consists of a spring-actuated pawl-lever, $h$, pivoted to the side of the rail $g$, through a slot in which its free end is made to project so as to stand in the path of the frame of the truck $g'$ as it rolls along the rail $g$, the stop-lever $h$ having connected thereto a lever, $h'$, by which the movable lever can be moved out of the path of the frame of the truck $g'$ and allow said truck to roll along the descending rail till it is again arrested by another similar stop.

As soon as the weight of the animal is removed from the drop $b'$ it returns to its former horizontal position by virtue of the pressure of the head of water acting upon the piston $d'$. The attendant closes the valve $d^3$ and the doors $b^2$ $b^2$ and opens the door $b$, when another animal steps confidently upon the fatal drop. Meanwhile an operator, standing on the floor J, opens the veins in the suspended animal's neck, and allows him to bleed, and then trips the truck-stop, and the carcass is allowed to move along the rail $g$, either to the left or right, according to which rail he was originally suspended from, it being understood that every alternate animal is suspended from one of the rails and the intermediate ones from the other rail—that is, when two gangs of men are working in the dressing-room. If, however, only one gang is working, then all the animals will be suspended from the same rail. When the truck is again arrested, and the animal is in the position shown at the extreme right of Fig. 4, an operator, standing on the floor J, skins the head and fore legs and cuts them off, while at the same time another operator, standing on the platform J', skins the tail and hind legs and cuts off the tail and the loose hind leg, when the truck-stop is tripped, and the carcass moves to the next position, where a portion of the upper or hinder part of the body is skinned, when the stop is again tripped and the carcass moves to the last position on the rail $g$, as shown at K, Fig. 4, when, it being in close proximity to the end of the ordinary truck-rails, $i$ $i$, which are sufficiently inclined to permit the weight of the carcass to cause the trucks from which it is suspended to roll along said rail until arrested by the automatic truck-stop, and the loose hind leg being at just about the right height, it is hooked at the hock-joint to one of the ordinary rail-truck hooks, $i'$, and the suspending leg not yet cut off is grappled just under the hoof by the claw-hook $j$, suspended at the proper height by a cord or chain, $j'$, which passes over the pulley $j^2$ and is wound upon the shaft or drum $j^3$, which carries the large hand-wheel $j^4$, the rim of which is in a convenient position to be reached by the man standing on the platform J', said shaft having connected thereto the cord or chain $j^5$, which passes over the pulley $j^6$, and has attached thereto the counter-weight $j^7$.

When the operator has hooked the claw $j$ to the leg, as described, he raises the locking-sleeve $g^{10}$ and turns the swivel-sleeve $g^6$ until the groove therein coincides with the spline on the rod $g^5$, when the splined rod $g^5$ will be drawn through said sleeve, thus lengthening the suspending-loop to which the hook $g^4$ is fastened and allowing the weight of the carcass to be transferred from the hook $g^4$ to the claw $j$. This having been done, the operator unhooks the hook $g^4$ from the grappled leg, and by easing up on the wheel $j^4$ allows the carcass to gradually settle down until the hock-joint of the grappled leg is at a convenient height, when it is again hooked to an ordinary rail-truck hook, $i'$, the truck of which is placed upon the rail $i$, when he lets go of the wheel $j^4$, disengages the claw-hook from the leg, and cuts it off just above the hock-joint, and thus the carcass is transferred from suspension by a single hook and leg from the rail $g$ to suspension by two hooks and legs from the rail $i$. When the hook $g^4$ is removed from the leg the truck-stop $h$ is tripped, and the truck carrying the hook $g^4$ runs down the rail $g$ around its return-bend to the point $k$, from which point it is easily reached by the man standing at the head of the dead-stall and moved to the rail $g$ just in the rear of the truck from which the last animal to go down the drop is suspended, he unhooking the cord $g^8$ from the truck on which the animal hangs and hooking it to the one just placed upon the rail, when the descent of the weight $g^9$ will cause the truck to roll up the incline of the rail $g$ to the rear end of the dead-stall B, where the hook $g^4$ is swung to one side, as before described, preparatory to hooking another animal.

When the carcass is fairly suspended upon the rail $i$ by both hind legs, as described, a stretcher, $l$, provided at each end with an eye or socket, $l'$, is applied to said hooks $i'$ $i'$, by inserting the upper end of each pivot or shank of the hooks $i'$ in one of the eyes $l'$, so as to maintain said hooks at all times at a uniform distance from each other, said stretcher being enlarged at its center, and provided on its upper side and at the center of its length with a detent-notch, $l^2$. The stretcher $l$ having been properly applied, the carcass is allowed to move along the rail $i$ until both of the suspending-trucks rest upon the pivoted section $i^2$ of said rail, where its forward movement is arrested by the latch $l^3$, which is pivoted to the section $i^2$, and is provided with a downwardly-projecting lug or tooth which drops into the notch $l^2$, and thus locks the truck-hooks $i'$ to the pivoted rail-section.

The rail-section $i^2$ is suspended from the timber $l^4$ by the central pivot, $l^5$, in such a manner that the carcass can be turned about to any desired position by the operator standing upon the platform K', who skins another portion of the upper part of the carcass, separates the pelvis-bones, and opens the rear portion of the body without moving out of his tracks, the carcass being turned, as desired, to bring the different parts into convenient position for the performance of the several operations.

When the operator has completed his allotted part of the work, he turns the carcass into the desired position to bring the section $i^2$ into its normal position, or in proper line with the fixed rail $i$, where it is automatically locked by the catch $l^6$, and then trips the latch $l^3$, when the carcass will move to the next position on the second pivoted rail-section $i^2$, at which point the middle portion of the carcass is skinned by a man standing on the platform L. The man on the platform L, having performed his part of the work, trips the latch $l^3$ and allows the carcass to move to the next position, where the skinning is completed by a man standing on the floor J of the dressing-room, having completed which, he trips the truck-stop $h$ and allows the carcass to move to the next position, where the intestines are removed upon the endless apron of the table O, where the tallow is removed from them by men stationed upon either side of the table, the apron of which is intermittently moved along toward the center of the building, where the refuse is discharged through an opening in the floor into a car or other receptacle in the basement N.

Instead of the table O, a circular table may be used fitted to revolve about a vertical axis, and provided with a central opening through which the refuse may be discharged to the floor below.

The tallow removed from the intestines is placed by the workman in the pan M of a floor-scale, whence it is discharged into a receptacle in the basement by tilting said pan after the tallow has been weighed. The hides are also weighed in the same scale, and dumped into a receptacle in the basement by tilting the pan in the opposite direction from that in which it was tilted to discharge the tallow.

In the next position the breast is opened and the vitals are removed and the internal cavity is rinsed. The next movement brings the carcass beneath the power-saw N', where it is locked and the saw is set in motion and passed vertically through the spinal column, dividing the carcass longitudinally into halves while it is still suspended from the rail $i$ by the truck-hooks $i'$ $i'$. The sides of beef are now run along the rails $i$ $i$ to the cooling-corridors D D, through which the air has free circulation from the cool cellar beneath to the ventilators in the upper part of the building, where they hang until sufficiently steamed off or cooled, when they are run into the refrigerating-rooms E E, from which at the desired time they are removed through the corridors D D to the cars G G, to be transported by land, or to the boat H for transportation by water, the several sides of beef still being suspended from the truck-hooks $i'$ $i'$, and so continue until they reach the store-house or refrigerator of the wholesale dealer, and are finally cut down for delivery to the retail dealer.

The cars G and boat H are fitted up with refrigerating-chambers, provided with rails $m$ $m$ corresponding to the rails $i$ $i$ of the cooling-corridors, refrigerators, and the dressing-room, and so arranged that when the cars or boat is brought into the desired position said rails may be made to form a junction with the rails $i$ $i$, as shown in Fig. 6.

In order to insure the proper level of the boat H to form such junction of the rails, I propose to use the wheel-truck or cradle R, adapted to run upon the inclined submerged track R', said cradle being run down said track to a position where the boat can be floated onto it, when the two are drawn up the inclined track until the weight of the boat rests firmly on the cradle, regardless of the varying height of the tide, and the rails $m$ $m$ on the boat are on a level with and coincide with the rails $i$ on shore, and when the boat is loaded the cradle is run down the inclined track until the boat H floats in the water, when it may be towed or otherwise moved to the desired point.

If the beef is destined for a foreign country across the sea, it will be conveyed on the lighter or scow H to deep water, where it will be transferred to the hold of an ocean-steamer, fitted up with rails like the lighter, from which the sides of beef are suspended in the same manner as on the lighter, and when the steamer reaches the foreign port they are again transferred to a lighter, and thence to the refrigerating-storehouse of the wholesale foreign dealer, still suspended from a truck-rail, and never having left said rail except to be hoisted from the lighter to the ocean-steamer, or to be lowered from the ocean-steamer to the lighter, and so are in equally proper and advantageous positions and condition to be kept after transportation as before.

The advantages of my improved system are, first, the facility for handling the live cattle, which obviates the necessity of catching them and the consequent loss of time and danger from so doing, and reduces the liability of the cattle injuring each other; second, there is no waiting for the animals to die, as there is room enough to deliver them sufficiently in advance to obviate the necessity of so doing, and there is no power or time expended in raising or lowering the dead carcasses; third, the opportunity to systematize the labor of dressing the cattle and the facility obtained by such systematizing by virtue of the ability acquired by men who direct their attention and energies to the performance of a single specified division of the work, together with the quickening of the faculties and nerving of the energies which working in a "team" inspires; fourth, the natural and convenient position and attitude of each man while doing his part, without waiting for another to help, each man working in his allotted place, with no moving about or being in each other's way; fifth, the concentration of the different parts, no gathering together of these distributed over a large territory—as, for example, the blood is all drained at one point, and therefore is not mixed with other substances, the heads with the tongues and cheeks are all together, and the same is true of the plucks at the last end of the dressing process; sixth, the difference in the splitting of the carcass is not only that between hacking and smooth-sawing, but a single man can repeat the operation every minute, including the time required to move the animal to and from the saw, and with no exhaustive labor; seventh, the economy of room is another very great consideration—less than one-third of the room required to accomplish the same amount of work in a given time that was required by the old methods; eighth, the great saving in expense for labor, two-thirds of which is saved by this new process and apparatus, with the work better done; ninth, the transportation of the dressed beef, which has been done heretofore by quartering and packing into wagons to be jolted over long rough roads exposed to heat and dust, is now to be done in tightly-closed rail-cars or refrigerator-boats, with the whole sides of beef hanging from rails onto which they are run directly from the hanging-rails of the slaughter-house coolers.

What I claim as new, and desire to secure by Letters Patent of the United States, is—

1. The process of handling and slaughtering beef-cattle by causing the animal to walk to the upper floor of the building and into a close stall, rendering him insensible, hooking, grappling, or otherwise making him fast to a supporting-rail while in said close stall, causing the animal to fall head downward till his whole weight is suspended from said rail, and then opening the veins in his neck, substantially as and for the purposes described.

2. The process of slaughtering and dressing beef-cattle by first causing the animal to walk to the upper floor of the building, rendering him insensible, making him fast by the hind leg to a supporting-rail, causing the animal to fall head downward till he is suspended entirely from said rail, opening the veins in his neck to bleed him, skinning the head, tail, and legs, cutting off the head, tail, and free legs, allowing the body to move by its own weight to a new position, changing the suspension from one to both hind legs, completing the skinning and removing the intestines and vitals at different points, and finally dividing the carcass into halves while suspended from the rail by sawing longitudinally through the spinal column, substantially as described.

3. The process of slaughtering and dressing beef-cattle and cooling and transporting the dressed beef by causing the animal to walk to the upper floor of the building, suspending him by a single hind leg head downward, bleeding him, dressing the head and legs and removing the head and free legs, allowing the body to move to a new position, changing the suspension from one to both hind legs, completing the dressing, and sawing the carcass into halves, at different points as it is intermittently moved along the suspension-rail, and arrested in such forward movement, and while suspended by the hind legs moving the sides of beef to the cooling-corridors, thence to the refrigerators, thence on board a car or boat, and finally from the car or boat to the wholesale dealer's storehouse, without changing the carcass or sides of beef from the position of suspension by the hind leg from the time that the animal is so suspended till it is cut down for delivery to the retail dealer, substantially as described.

4. In a slaughter-house, one or more gradually-ascending inclosed passage-ways for the passage of animals to the dead-stall, adapted and arranged to compel the animals to pass in single file, in combination with a parallel passage along which the keeper or attendant in charge of the animals may pass, substantially as described.

5. The method of suspending beef-cattle by hooking, grappling, or otherwise connecting the animals by the hind legs to a truck-rail or other support, while said animals are in a close pen, without moving them, and allowing them to fall head downward, as distinguished from hoisting them to a higher level, as heretofore practiced, substantially as described.

6. The dead-stall B, provided with the doors $b$ and $b^2$ and the pivoted drop $b'$, in combination with mechanism, substantially as described, for supporting said drop and allowing it to fall at the desired time.

7. The combination of the dead-stall B, provided with the pivoted drop $b'$, the water-cylinder $d$, piston $d'$, connected to said drop by suitable piston and connecting rods, the pipe $d^2$, valve $d^3$, and means of operating said valve from the upper floor, substantially as and for the purposes described.

8. The combination of the rail $g$, truck $g'$, pulley-block $g^3$, hook $g^4$, the splined rod $g^5$, swivel-sleeve $g^6$, and the chain $g^7$, all constructed, arranged, and adapted to operate substantially as and for the purposes described.

9. The combination of the rail $g$, truck $g'$, hook $g^4$, the intermediate connecting devices between said hook and truck, the cord or chain $g^8$, and the weight $g^9$, all arranged and adapted to operate substantially as and for the purposes described.

10. The method of transferring the carcass from suspension by a single rail-truck to suspension from two rail-trucks at a lower level, which consists in hooking the suspending-leg under the hoof to a claw-hook adapted to be raised or lowered at will, slacking and unhooking the hook from the hock-joint of said leg, attaching the hock-joint of the other or free leg to a truck-hook suspended from a rail situated at a lower level, lowering the carcass till a portion of its weight is borne by said truck-hook, hooking a second truck into the hock-joint of the claw-grappled leg, lowering the carcass till its whole weight is suspended by the two truck-hooks, and then detaching the claw-hook from the leg to which it was attached, substantially as described.

11. As a means of transferring the carcass from suspension by a single leg to suspension by both hind legs, the combination of the rails $g$ and $i$, arranged at different heights, the extensible truck-hook $g^4$, claw-hook $j$, suspended from the shaft $j^3$, the wheel $j^4$, counter-weight $j^7$, and the two truck-hooks, $i'$ $i'$, all constructed and adapted to co operate substantially as and for the purposes described.

12. The automatic truck-stop $h$, in combination with an inclined rail and a truck fitted to roll upon said rail, and having suspended therefrom a hook, substantially as described.

13. The combination of the rail $i$, the pivoted rail-section $i^2$, the two truck-hooks $i'$, the stretcher $l$, provided with the detent-notch $l^2$, and the locking-latch $l^3$, all constructed, arranged, and adapted to operate substantially as and for the purposes described.

14. The combination of the labyrinthine close pen A, the dead-stall B, provided with the pivoted and movable drop $b'$, the slightly-inclined rail $g$, and the hook $g^4$, suspended from said rail by the truck $g'$ and an extensible connection, substantially as described.

15. The combination of the labyrinthine close pen A, the dead-stall B, provided with the pivoted and automatically-operated drop $b'$, the rails $g$ and $i$, located at different heights, the extensible truck-hook $g^4$, windlass $j^3$ $j^4$, carrying the claw-hook $j$, truck-hooks $i'$ $i'$, and the swiveling rail-sections $i^2$, substantially as described.

16. The combination of the labyrinthine close pen A, the dead-stall B, provided with the pivoted and automatically-operated drop $b'$, the inclined rails $g$ and $i$, located at different heights, the extensible truck-hooks $g^4$, the windlass $j^3$ $j^4$, carrying the claw-hook $j$, the truck-hooks $i'$ $i'$, stretcher $l$, platforms J', K', and L, the automatic truck-stops $h$, one or more, and a power-saw for dividing the carcass longitudinally while suspended from the rail $i$, substantially as described.

17. The combination, in a slaughtering apparatus, of an inclined elevated rail-track, one or more truck-hooks adapted to roll along said rail and to support a bullock, a series of automatic truck-stops, $h$, attached to said rail, and a series of platforms of different heights located side by side and in close proximity to the path of movement of a bullock suspended from said hooks, substantially as and for the purposes described.

18. The combination of the truck $g'$, pulley-block $g^3$, splined rod $g^5$, hook $g^4$, slotted swivel-sleeve $g^6$, provided with the detent-notch $r$, chain $g^7$, and the secondary sleeve $g^{10}$, provided with a tooth to fit the notch in sleeve $g^6$ and lock it, substantially as described.

19. The combination of the pulley-block $g^3$, splined rod $g^5$, chain $g^7$, hook $g^4$, swivel-sleeve $g^6$, and the secondary non-swiveling locking-sleeve $g^{10}$, all arranged and adapted to operate substantially as and for the purposes described.

Executed at Boston, Massachusetts, this 24th day of November, 1880.

JAMES H. SPARROW.

Witnesses:
W. E. LOMBARD,
E. E. CHANDLER.